Sept. 15, 1964

P. J. GIBBS ETAL 3,148,556

GEARED SPEED CHANGER

Filed May 28, 1962

INVENTORS.
Paul J. Gibbs
Thomas P. Beggs
BY John A. Hamilton
Attorney.

United States Patent Office 3,148,556
Patented Sept. 15, 1964

3,148,556
GEARED SPEED CHANGER
Paul J. Gibbs, 218 E. 55th Terrace, and Thomas P. Beggs, 3421 E. 62nd St., both of Kansas City, Mo.
Filed May 28, 1962, Ser. No. 198,192
3 Claims. (Cl. 74—325)

This invention relates to new and useful improvements in speed changers, and has particular reference to speed changers of the gear type including a gear box containing gear sets of various ratios interconnecting power input and output shafts.

An important object of the present invention is the provision of a speed changer of the character described providing a wide variety of possible gear ratios in an extremely simple and economical manner, at a fraction of the cost of previous changers of comparable flexibility. Generally, this object is accomplished by providing a plurality of gear sets of different ratios which may interchangeably and manually be inserted in the gear train of the changer as may be desired, rather than by a relatively highly complicated gear shifting mechanism as is usually the case. A novel arrangement of parts permits this manual interchange of gear sets to be made very rapidly and easily, and without the use of any tools other than the hands. Gear sets not in use may be safely stored in the gear case of the speed changer.

Other objects are overall simplicity and economy of construction, efficiency and dependability of operation, and adaptability for use in a wide variety of speed and power ranges.

Figure 1:
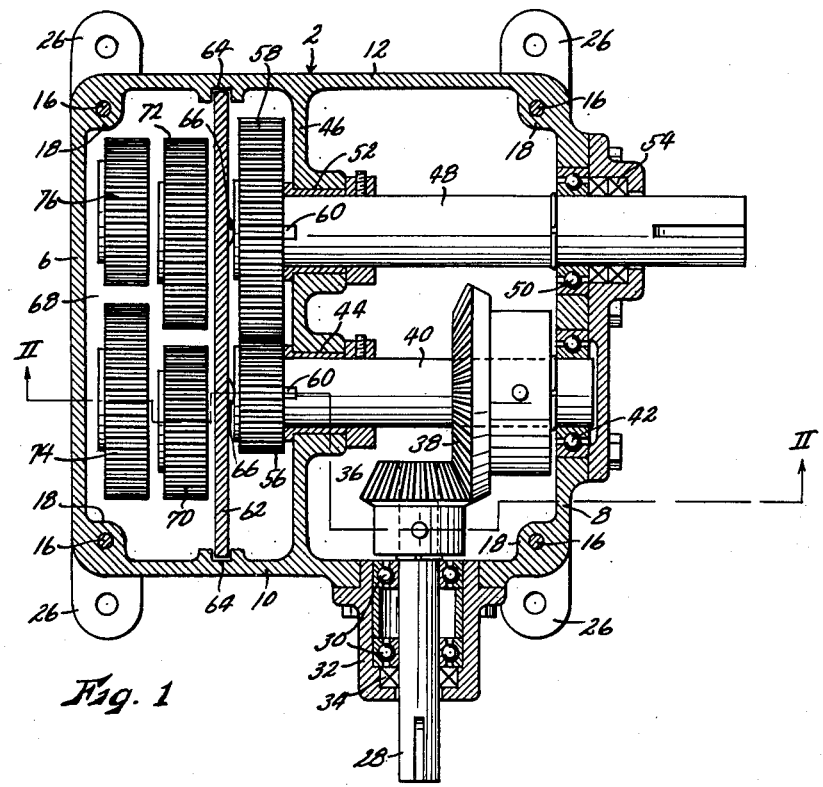
Figure 2:
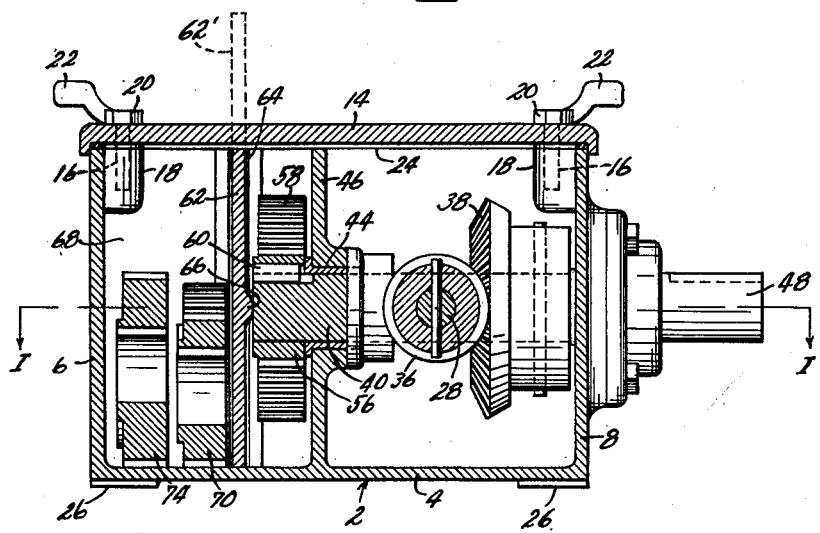

With these objects in view, as well as other objects which will appear in the course of the specification, reference will be had to the accompanying drawing, wherein:

FIG. 1 is a horizontal sectional view of a speed changer embodying the present invention, taken on line I—I of FIG. 2, with parts left in elevation, and FIG. 2 is a sectional view taken on line II—II of FIG. 1.

Like reference numerals apply to similar parts throughout the drawing, and the numeral 2 applies generally to the case or housing of the speed changer, said housing having a rectilinear box-like form open at the top and including a bottom wall 4, side walls 6 and 8, front wall 10, and rear wall 12. Said housing is provided with a cover 14 attached removably thereto by a plurality of screws 16 extending through said cover and threaded in lugs 18 formed integrally with the housing. The enlarged head 20 of each screw (see FIG. 2) is provided with a radially projecting arm 22 whereby said screws may be removed by hand and without a wrench or other tool. A gasket 24 is interposed between the cover and the housing to seal said housing. The housing is also provided with integral perforated lugs 26 whereby said housing may be mounted as desired.

A power input shaft 28 extends horizontally through front wall 10 of the housing, being journalled rotatably in ball bearings 30 carried in a bearing case 32 fixed in said wall. Said shaft is also provided with an oil seal 34. Externally of the housing, shaft 28 is adapted to be connected to any suitable source of power, such as an electric motor, not shown. Internally of the housing, shaft 28 has a bevel gear 36 fixed thereon which is meshed with a bevel gear 38 fixed on shaft 40. Shaft 40 is horizontal and extends at right angles to shaft 28, being journalled at one end in a ball bearing 42 mounted in side wall 8 of the housing, and being journalled adjacent its opposite end in a bushing 44 fixed in a partition wall 46 integral with the housing. Said wall is disposed parallel to and intermediate side walls 6 and 8.

Shaft 40 extends beyond said partition wall toward side wall 6.

An output shaft 48 is disposed parallel to shaft 40, being journalled in a ball bearing 50 mounted in side wall 8 and in a bushing 52 fixed in partition 46. Said shaft extends outwardly from side wall 8 through oil seal 54 for connection to a mechanism to be driven, and extends past partition 46 toward side wall 6, coextensively with shaft 40. A pair of meshing gears 56 and 58 mounted respectively on the end portions of shafts 40 and 48 extending toward side wall 6. Said gears fit sufficiently loosely on said shafts that they may be manually pulled off of the ends of the shafts, but are prevented from rotating on said shafts by keys 60. Said gears are normally secured against removal from said shafts by a retainer plate 62 which is disposed vertically and parallel to partition 46, closely adjacent the ends of shafts 40 and 48. The vertical edges of said plate are disposed slidably in grooves 64 formed respectively in front wall 10 and rear wall 12 of the housing. Also, said retainer plate extends the full height of the housing, so that when the lower edge thereof rests on bottom wall 4 of the housing, its upper edge is directly adjacent cover 14. Hence the retainer plate is locked in place and cannot be removed while cover 14 is in place. Said retainer plate may also be provided with a pair of rounded protuberances 66 which respectively abut the ends of shafts 40 and 48 when the retainer plate is in its normal position, whereby to resist possible longitudinal shifting of said shafts.

A chamber 68 is formed between retainer plate 62 and side wall 6 of the housing. In this chamber may be stored sets of gears such as gears 70–72 and gears 74–76, each of which sets of gears is identical with gear set 56–58 except that they have different ratios, and which may be selectively interchanged with gears 56–58. Obviously, the number of gear sets which may be stored in chamber 68 is limited only by the size of the chamber.

Operation of the speed changer is believed to be reasonably self-evident. The power train from input shaft 28 is through gear 36, gear 38, shaft 40, gear 56, and gear 58 to output shaft 48. The speed ratio between shafts 28 and 40 is determined by gears 36 and 38, and is never changed, while the speed ratio between shafts 40 and 48 is determined by gears 56 and 58, and may be changed by substituting gears 70–72 or 74–76 for gears 56–58. Obviously, other gear sets corresponding to gears 36 and 38 could be inserted in the power train, both before and after gears 56–58, within the scope of the invention, in order to provide more extreme overall ratios. For this reason, the shaft on which gear 58 is mounted is not necessarily the output shaft, and shaft 48 will therefore hereinafter be designated simply as a "driven" shaft, and shaft 40 as a "driving" shaft.

When it is desired to change the overall ratio of the changer, cover 14 is first removed after removing screws 16, which may be done without tools as previously described. Gasket 24 is provided because the housing is ordinarily partially filled with oil. After the cover is removed, retainer plate 62 may be lifted free of the housing, as indicated in dotted lines at 62′ in FIG. 2. Gears 56 and 58 may then be pulled off of the ends of shafts 40 and 48 by hand, the spacing of said shafts from housing wall 6 being greater than the axial thickness of the gears. Another set of gears, such as set 70–72 or set 74–76, may then be slipped on the shafts, retainer plate 62 reinserted in grooves 64, and cover 14 secured in place by screws 16. Retainer plate 62 also serves as a partition preventing any possible fouling of the operative gears on shafts 40 and 48 by the loose gears in chamber 68.

While we have shown and described a specific embodiment of our invention, it will be readily apparent that many minor changes of structure and operation could be made without departing from the spirit of the invention as defined by the scope of the appended claims.

What we claim is:
1. A geared speed changer comprising:
   (a) a housing,
   (b) a power train in said housing including
      (1) a rotatable driving shaft,
      (2) a rotatable driven shaft, said driving and driven shafts having unsupported end portions extending toward but spaced apart from an interior wall of said housing, and
      (3) a pair of meshing gears carried respectively on the unsupported end portions of said driving and driven shafts, being freely slidable axially of said shafts but secured against rotation thereon, the spacing of the ends of said shafts from said interior housing wall being greater than the the axial thickness of said gears whereby said gears may be slidably removed from said shafts, said housing having an opening formed in a wall thereof parallel to and adjacent the unsupported end portions of said shafts,
   (c) a retainer member mounted slidably in fixed guideways integral with said housing for movement at right angles to said shafts and disposed normally closely adjacent the ends of said shafts whereby to secure said gears on said shafts, said retainer member being removable from said housing by movement thereof through said housing opening, and
   (d) a cover plate removably secured to said housing and covering said opening, whereby both to seal said housing and also to prevent removal of said retainer member.

2. A geared speed changer as recited in claim 1 wherein said housing opening provides access to the entire interior of said housing, not merely to said removable gears, whereby removal thereof permits servicing or repair of the entire speed changer.

3. A geared speed changer as recited in claim 1 wherein said retainer member constitutes a wall-like partition forming a chamber intermediate said retainer member and said interior housing wall, and with the addition of:
   (a) a plurality of additional pairs of gears similar to the pair recited except for having different ratios, and being selectively interchangeable with the recited pair of gears, said additional pairs of gears being stored in said chamber and maintained by said retainer member out of possible contact with the operative pair of gears mounted on said shafts.

References Cited in the file of this patent
UNITED STATES PATENTS

| | | |
|---|---|---|
| 1,167,887 | Clarke | Jan. 11, 1916 |
| 3,015,966 | Howard | Jan. 9, 1962 |